United States Patent [19]

Steele et al.

[11] Patent Number: 5,651,147
[45] Date of Patent: Jul. 29, 1997

[54] THREE-WAY TRAP ELBOW AND CLEANOUT SYSTEM

[76] Inventors: David Stuart Steele, 611 Ridge Rd., Monmouth Jct., N.J. 08852; Robert Reuben Taylor, 42 Harrison St., Morristown, N.J. 07960

[21] Appl. No.: 561,087

[22] Filed: Nov. 20, 1995

Related U.S. Application Data

[62] Division of Ser. No. 248,755, May 25, 1994, Pat. No. 5,509,148.

[51] Int. Cl.⁶ ............................................................. E03D 9/00
[52] U.S. Cl. ................................. 4/255.01; 4/255.04
[58] Field of Search ........................... 4/255.01, 255.04, 4/255.06, 255.07, 255.08

[56] References Cited

U.S. PATENT DOCUMENTS

| | | |
|---|---|---|
| 528,459 | 10/1894 | Beliveau . |
| 798,713 | 9/1905 | Strickland . |
| 831,722 | 9/1906 | Holmes . |
| 898,234 | 9/1908 | Lisenby . |
| 1,066,329 | 7/1913 | Schwedler . |
| 1,156,907 | 10/1915 | King . |
| 1,185,960 | 6/1916 | Wessels . |
| 1,201,081 | 10/1916 | Nilson . |
| 1,217,763 | 2/1917 | Hirrich . |
| 1,495,303 | 5/1924 | Heidelberg . |
| 1,708,381 | 4/1929 | Deacon . |
| 1,938,064 | 12/1933 | Carmine ............................ 4/255.06 |
| 2,028,779 | 1/1936 | Howe et al. . |
| 2,039,467 | 5/1936 | Walsh ................................. 4/255.01 |
| 2,292,329 | 8/1942 | Sisk . |
| 2,533,720 | 12/1950 | Danel . |
| 2,602,168 | 7/1952 | Lalley et al. . |
| 2,644,543 | 7/1953 | Russell . |
| 2,834,615 | 5/1958 | Bleakley . |
| 2,903,088 | 9/1959 | Spann . |
| 3,513,025 | 5/1970 | Gutrich ............................... 4/255.04 |
| 3,936,892 | 2/1976 | Miller . |
| 4,145,768 | 3/1979 | Chevrette ........................... 4/DIG. 7 |
| 4,179,762 | 12/1979 | Barnhardt et al. . |
| 4,321,712 | 3/1982 | Dixon . |
| 4,371,991 | 2/1983 | Schrott ............................ 137/247.51 |
| 4,391,551 | 7/1983 | Belcher ............................... 285/150 |
| 4,546,789 | 10/1985 | Taylor . |
| 5,004,025 | 4/1991 | Robbins ............................. 4/255.01 |
| 5,107,550 | 4/1992 | Hawro ................................ 4/255.08 |

*Primary Examiner*—Henry J. Recla
*Assistant Examiner*—Charles R. Eloshway
*Attorney, Agent, or Firm*—Watov & Kipnes, PC

[57] ABSTRACT

A three-way elbow for connection between a trap and a waste line is provided with a valved access ending in a plug. Removal of the plug allows attachment of a first end of a hose in its place. The second end of the hose is held above the water level of a sink by attachment to a board that fits over the sink. A snake inserted through the hose is directed by passageways in the elbow to the waste line. A container is mounted between a faucet for the sink and the second end of the hose so that disinfectant in the container can be carried into the hose. Brushes are mounted in the second end of the hose so as to aid in cleaning the snake as it is withdrawn.

2 Claims, 4 Drawing Sheets

THREE-WAY TRAP ELBOW AND CLEANOUT SYSTEM

This is a division, of application Ser. No. 08/248,755 filed on May 25, 1994 now U.S. Pat. No. 5,509,148.

FIELD OF THE INVENTION

The invention is in the field of plumbing fittings, and cleanout systems

BACKGROUND OF THE INVENTION

The procedure for cleaning a clogged drain, especially in a health care facility, creates the risk of exposure to hazardous and infectious medical waste. OSHA mandates that in a situation where it is difficult or impossible to differentiate between body fluids, all fluids and materials present shall be considered potentially infectious wastes. OSHA also recommends that bulk blood, excretions, secretions and tissue that can be ground should be disposed of by pouring them down a sanitary sewer drain. Since it is impossible to determine what type of fluids are present in a particular sewer drain, all traps and waste lines must be treated as an exposure hazard.

OSHA first recommends the incorporation of engineering controls to reduce or eliminate splashing, spraying or aerosolization of infectious materials, when suck controls are available. Secondly, OSHA requires universal precautions such as gloves, goggles, and impervious aprons to further reduce the risk of exposure. Finally, at the completion of the job, any plumbing snake used in unclogging a drain must be stored in a durable, leak-proof container, and transported to a remote area for disinfecting and decontaminating prior to its next use per OSHA requirements.

To fully appreciate the hazards of servicing a clogged drain, it is necessary to understand the procedure. First, any standing water in the affected sink must be removed by bailing. Next, the trap is removed, and any remaining sewer wastes will splash and spray out of the opened waste line. Then, an electric snake is forced into and out of the waste line. The snake, which is a coiled steel cable, must be used while spinning in order to negotiate the turns in the waste pipe. The spinning cable will spray both solid and liquid wastes on the plumber, under enclosed cabinets, completely around the work area, everywhere. Finally, the trap is reassembled, and the system is tested to see if the clog has been removed. Quite often, two or more attempts are required before the clog is removed, and each successive attempt is made with already contaminated equipment.

The U.S. Pat. No. 4,546,789 issued on Oct. 15, 1985 shows one valved fitting for attachment in place of a cleanout plug and another valved fitting to a "J" trap, but neither is such that it can be mounted between a trap and a waste line in such manner that a snake thrust through the fitting will be guided to the waste line rather than the trap. Furthermore, no means are provided whereby a snake used to clear a clog in the waste line can be cleaned and disinfected as it is withdrawn so as to not expose a plumber using it to contamination.

BRIEF SUMMARY OF THE INVENTION

The system of this invention provides engineering controls that fully meet and exceed OSHA's requirements for workers' safety. It effectively eliminates direct contact exposure with infectious medical wastes during a drain cleaning operation by the use of a valved access design that allows the plumber to enter a snake into the waste line without the need to bail a sink or disassemble the trap.

The system of this invention includes a three way elbow fitting having a first port for coupling to the waste line, a second port coupled via a valve to a removable plug and a third port adapted to be coupled to the output of a "U" trap under a sink. In use, the elbow is permanently connected between the output of the trap and the waste line. Also provided is a board that will cover the sink, a flexible hose, one end of which can be connected in place of the plug, means for removably attaching the other end of the hose to the board, means for conducting a flow of water into the latter end of the hose and means for introducing disinfectant material into the flow of water between the tap and the hose. Brushes are provided that can be inserted in the other end of the hose, in a cup connected to the other end.

When clogging occurs in the waste line, hazardous material may be found in the sink or at any point between the sink and the clog in the waste line. In accordance with a standing instruction, the valve is kept closed in order to prevent such material from reaching the plug.

In using this invention, a plumber removes the plug, couples one end of the flexible hose to the opening vacated by the plug and attaches the other end to the board which has been previously placed on the sink. The valve is then opened so as to cause the waste water to rise in the hose to its level in the sink. An electric motor or manually driven snake is placed on the board and run through the hose and into the waste line via the first and second ports. The angles at which the passageways associated with the ports in the elbow meet are such as to induce the snake to enter the waste line rather than the trap. When water drains from the sink, this indicates that the clog is Cleared. There is no need to reconnect the equipment and try again as in the old procedure.

After the sink drains, the snake is kept spinning while hot water is run into the sink. This loosens built up material from the inside walls of the waste line and prerinses the lower portion of the snake. The means for conducting a flow of water from the tap to the hose, and the means for introducing disinfectant into the flow water are connected. Brushes are mounted in the hose. After the brushes are inserted in the hose, the snake is slowly removed from the hose so that it is further cleaned by the brushes and disinfectant. The cleaned snake is then placed in a leakproof container so as to be ready for the next job, or for further cleaning and sterilization at an appropriate site.

BRIEF DESCRIPTION OF THE DRAWINGS

Various embodiments of the present invention are described below with reference to the drawings, in which like items are identified by the same reference designation, and in which.

DETAILED DESCRIPTION OF THE INVENTION

Figure 1:
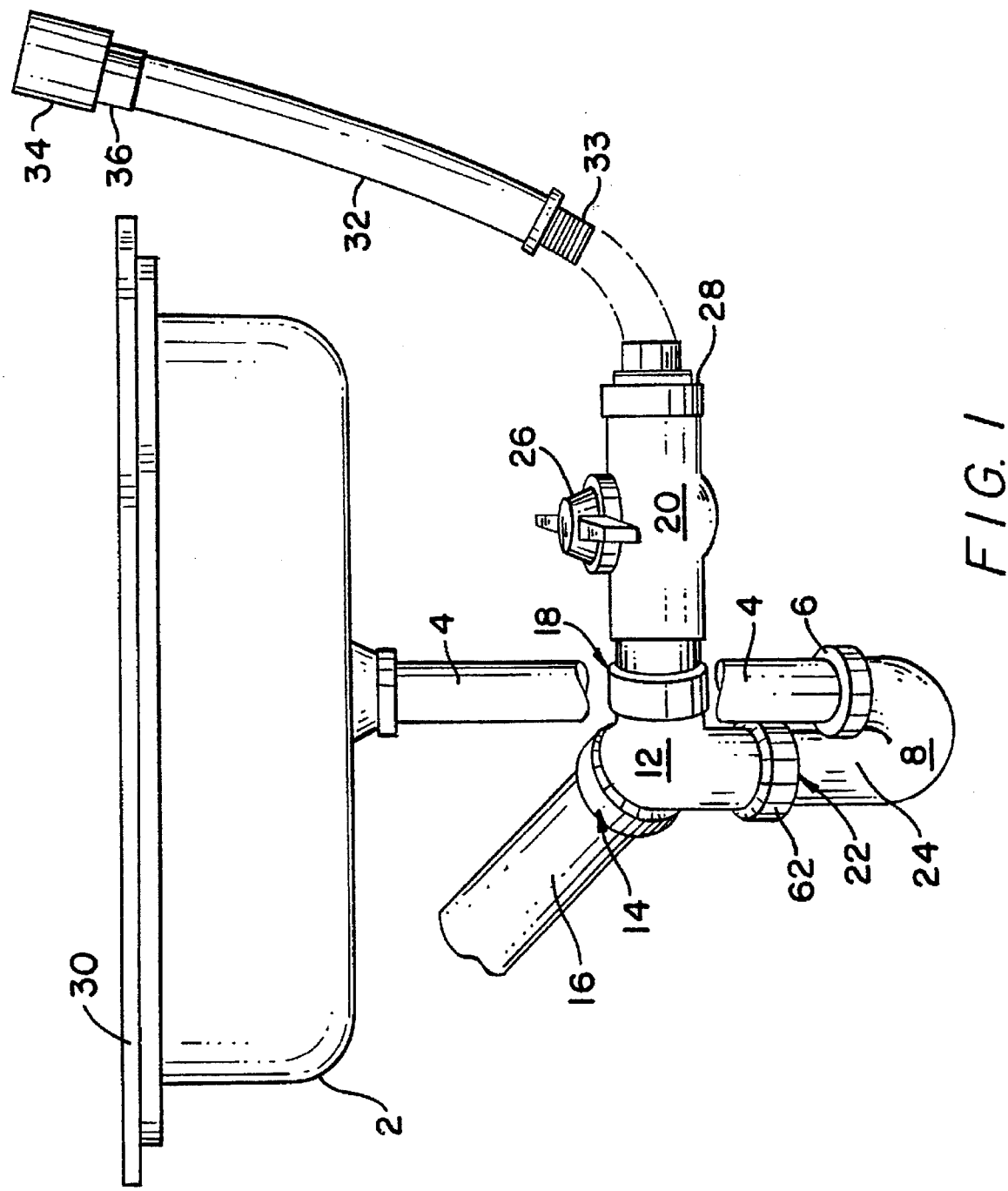
FIG. 1 is a view under a sink illustrating both a plumbing fitting of the invention as it would appear when installed, and a cleanout hose positioned for installation.

FIG. 1 is a view of plumbing under a sink 2 that incorporates this invention. A sink drain line 4 is coupled to the input 6 of a "U" shaped trap 8. A portion of the sink drain line 4 is not shown in order that it not obscure the fitting of this invention that is behind it. The fitting includes a three way elbow 12 having a port 14 adapted to be coupled to a waste line 16, a port 18 coupled to a pipe 20, and a port 22 adapted to be coupled to the output pipe 24 of the "U" trap 8. The pipe 20 contains a valve 26 and a removable plug 28 at the end remote from the elbow 12. The waste line 16 is perpendicular to a wall on which the sink 2 is mounted and conveys waste from the sink 2 to a main sewer line not shown.

In normal use, the valve 26 is closed and the plug 28 is mounted in the position shown so that waste from the sink 2 flows to the waste line 16 via the sink drain 4, the "U" trap 8 and a passageway, not shown, between the port 22 and the port 14 of the elbow 12.

Figure 2A:
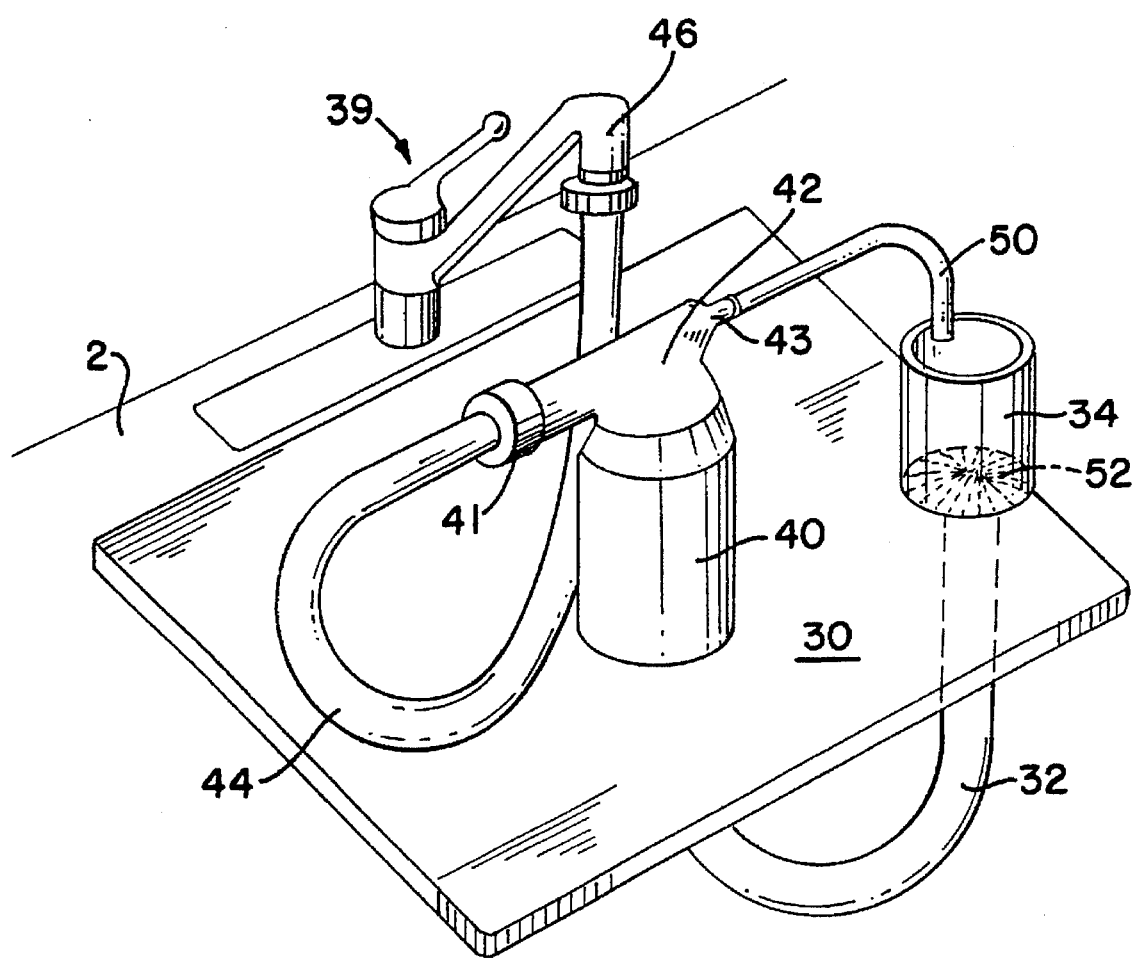
FIG. 2A is a top view of a sink illustrating the apparatus for supplying water and disinfectant to the cleanout hose.
Figure 2B:
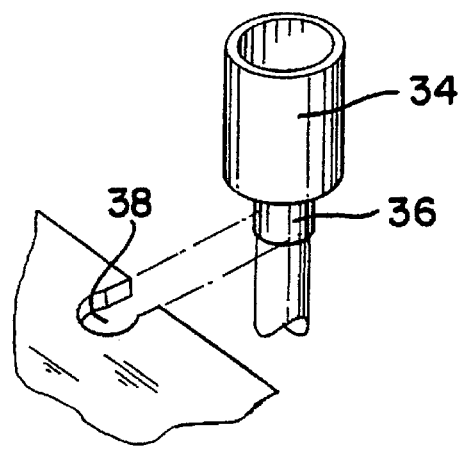
FIG. 2B illustrates a detail view of a notch in the board for removable retaining the clean-out hose.

When there is a clog in the waste line 16 or the sewer line to which it is connected, a board 30 is placed on top of the sink 2 (see FIGS. 1 and 2A), the plug 28 is removed and one end of a cleanout hose 32 is coupled via fitting 33 in its place. A cup or funnel 34 that is connected to the other end of the hose 32 by a cylinder 36 is placed above the sink 2 by inserting the collar 36 into a notch 38 in the board 2, FIG. 2B. Valve 26 is opened, and water or liquid waste rises in the hose 32 to its level in the sink 2.

In order to clear the clog, a snake (not shown) that is preferably rotatable by an electric motor is inserted through the cup 34, the hose 32, the pipe 20 and the passageway, not shown, between the port 18 and the port 14 of the three way elbow 12 and along the waste line 16 to the clog. When the clog clears, water drains from the sink and a faucet 39 is turned on to flush waste from the trap 8 and the waste line 16 and to clean the portion of the snake inside the waste line 16.

The following means for introducing a flow of water or water and a disinfectant into the funnel or cup 34 are then used. A container 40 similar to those used in spraying fertilizer is coupled to a cap 42 with an inlet port 41, and an outlet port 43. One end of a hose 44 is coupled in any suitable manner to inlet port 41 of the cap 42, and the other end of hose 44 is adapted to be coupled to the spout 46 of the faucet 39, as shown. A typical plumbing code requires a vacuum breaker attachment to prevent siphoning of waste into fresh water supply. One end of a hose 50 is coupled to the outlet port 43 of the cap 42 in any suitable manner, and its other end is placed in the cup 34. Liquid disinfectant in the container 40 will be entrained in a flow of water passing through the cap 42 via a venturi mechanism, as is known in the art.

At this point, the water is turned on and the snake (not shown) is slowly withdrawn so that more contaminants can be removed from it. As an aid to this function, brushes 52 are mounted in the cup 34. After the snake is withdrawn, the valve 26 is closed and the plug 28 is reinserted in the open end of pipe 20, as shown. The snake is placed in a container so as to be ready for the next job, or further cleaning and sterilization at a remote site.

Figure 3:
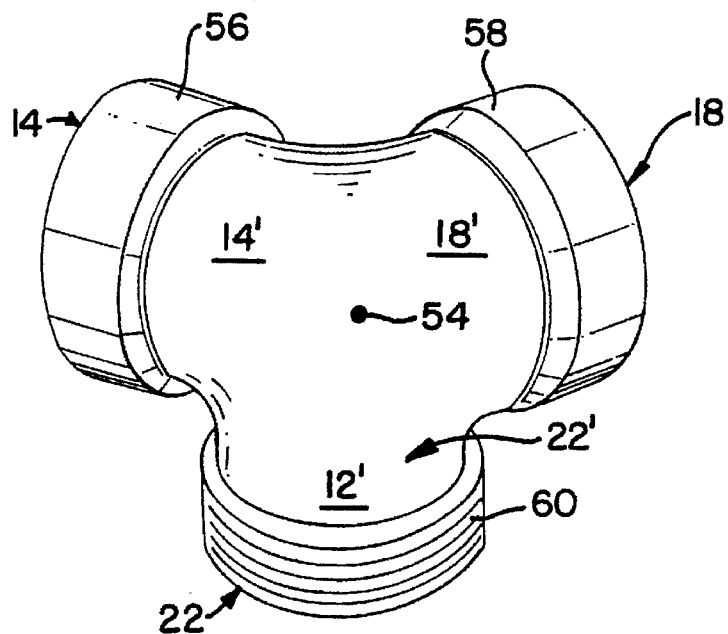
FIG. 3 is a front view of a three way elbow used in one embodiment of this invention.

In this particular embodiment of the invention, the three way elbow 12 is preferably constructed by molding plastic, such as PVC, or by cast metal. As shown in FIG. 3, passageways 14', 18', and 22' that respectively communicate with the port 14 and the ports 18 and 22 lie within the elbow and meet at a junction 54. A common volume or area is shared by passageways 14', 18', and 22' proximate junction 54, as shown. Annular hubs 56 and 58 that are adapted for coupling with PVC to an interfitting plastic member are formed around the ports 14 and 18, and threads 60 are formed around the port 22. The threads 60 are designed to mate with internal threads on the customary rotatable collar 62 at the output 24 of the "U" trap 8. Alternatively, the threads 60 can be replaced by either a glue or sweat fitting, for example.

Figure 4:
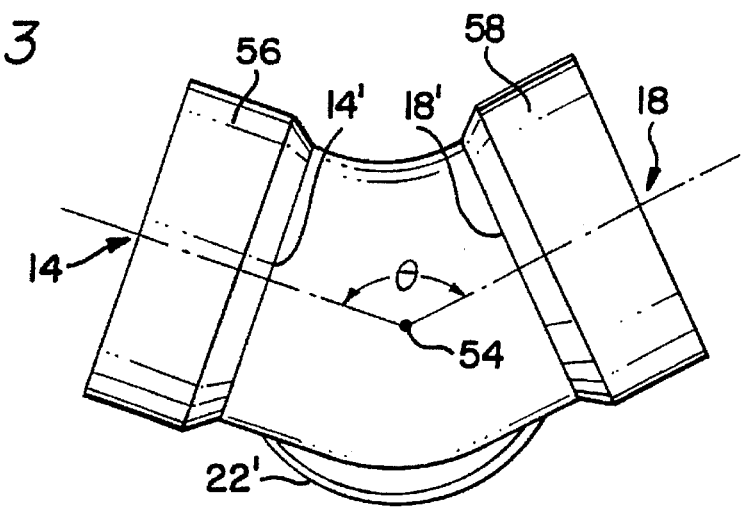
FIG. 4 is a top view of a three way elbow used in one embodiment of this invention illustrating the preferred angle between two of the passageways.

In a preferred embodiment of the invention, shown in FIG. 4, the passageways 14' and 18' meet at an angle θ that is between 90° and 180° and the passageways 14' and 22' meet at an angle of 90° in order to make it easier for the snake entering through the passageway 18' to go into the passageway 14' that leads to the waste line 16 rather than into the passageway 22' leading to the trap 8. The angle between the passageways 14' and 22' is 90° because the output pipe 24 of the "U" trap 8 is vertical and the waste line 16 typically is perpendicular to a wall. The angle θ between the passageways 14' and 18' is preferably 135°. The angle between the passageway 22' and the passageway 18' is shown as being 90°.

Figure 5:
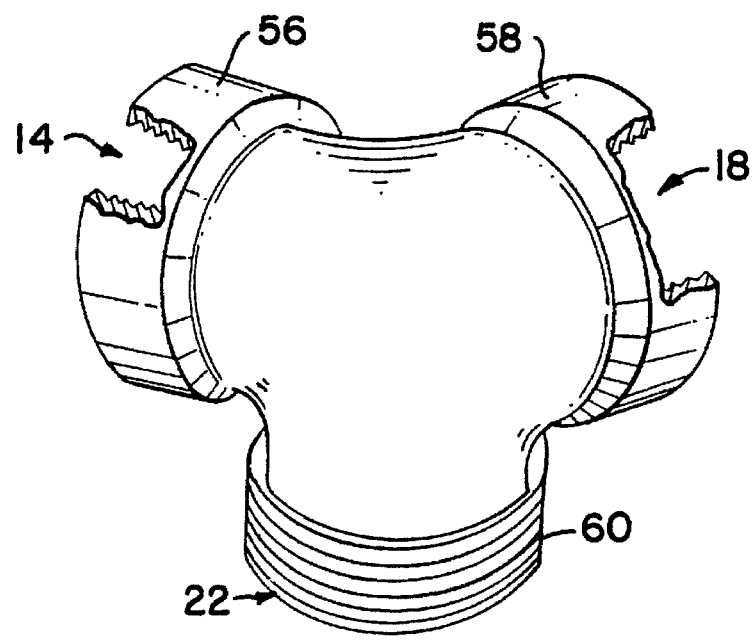
FIG. 5 is a front view of a three way elbow used in one embodiment of this invention illustrating threaded connections at each opening.

FIG. 5 is similar to FIG. 3 except for the means for coupling to the waste line 16 and the pipe 20. Instead of being adapted for adhesive bond connections using PVC piping, the hubs 56 and 58 have internal threads when metal, such as copper or rough brass, is used for elbow 12 and the piping, for example.

Figure 6:
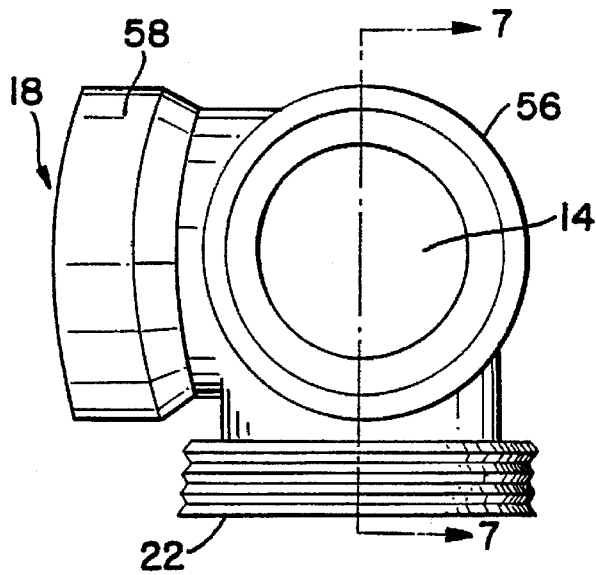
FIG. 6 is a view of a three way elbow used in one embodiment of this invention taken along an axis of one of the passageways therein.

FIG. 6 is a front elevational view of FIG. 3 taken along the axis of the port 14.

Figure 7:
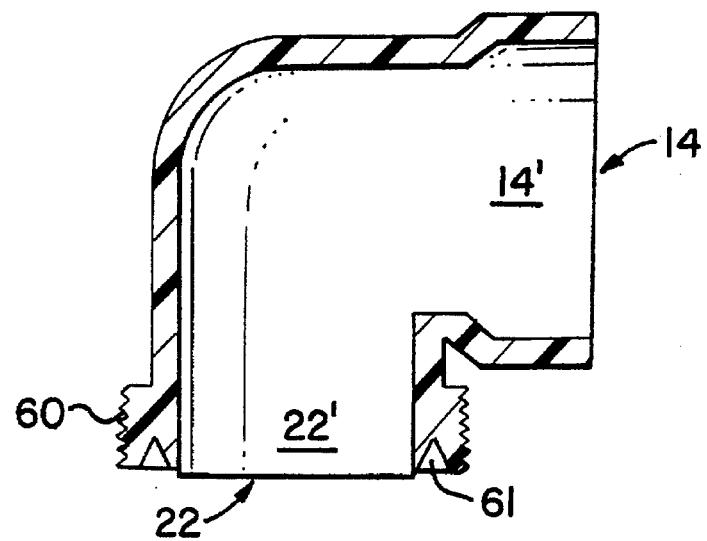
FIG. 7 is a cross section taken along 7—7 of FIG. 6.

FIG. 7 is a cross section 7–7 of FIG. 6 taken perpendicular to the axis of the passageway 18', and parallel to the axis of passageway 22'.

Note that V-groove 61 provides for permitting a water-tight seal with a standard J-bend or U-drain 8, as is known in the art.

Although various embodiments of the invention are described herein for purposes of illustration, they are not meant to be limiting. Those of skill in the art may recognize modifications that can be made in the illustrated embodiments. Such modifications are meant to be covered by the spirit and scope of the appended claims.

What is claimed is:

1. A method for providing a plumbing configuration for unclogging a connecting line between a trap and a sewer line should the connection become clogged, said method comprising steps of:

removing any coupling between the trap and the connecting line so as to provide an open end of the connecting line and an open outlet of the trap;

configuring a three-way elbow to have first and second opposing outlets connected by a first pipe and a third outlet connected by a second pipe to said first pipe, said pipes being perpendicular;

coupling a first outlet of said three-way elbow to the open end of the connecting line;

coupling a valve to a second outlet of the three-way elbow, the valve being normally closed;

coupling a third outlet of the three-way elbow to the open outlet of the trap;

coupling a first end of a flexible hose to the valve;

coupling a funnel to the second end of the flexible hose;

mounting the funnel above the level of any liquid in the sink;

opening the valve;

passing a snake into the connecting line via the funnel, the flexible hose, the valve, and the second and first outlet of the three-way elbow;

operating the snake so as to free any obstruction in the connecting line;

withdrawing the snake while pouring disinfectant into the funnel;

closing the valve; and decoupling the first end of the flexible hose from the valve.

2. A method as set forth in claim 1, further comprising the step of:

coupling a plug to the valve when the flexible hose is disconnected therefrom.

* * * * *